(12) United States Patent
Tang et al.

(10) Patent No.: US 12,487,161 B2
(45) Date of Patent: Dec. 2, 2025

(54) MICRO-METAL TUBE THROMBUS ELASTICITY DETECTION DEVICE AND METHOD BASED ON L(0,1) LONGITUDINAL MODE GUIDED WAVE

(71) Applicants: ZHEJIANG UNIVERSITY, Zhejiang (CN); HUZHOU INSTITUTE OF ZHEJIANG UNIVERSITY, Zhejiang (CN)

(72) Inventors: Zhifeng Tang, Zhejiang (CN); Fengjiang Zhang, Zhejiang (CN); Zhengyang Huang, Zhejiang (CN); Jianjun Wu, Zhejiang (CN)

(73) Assignees: ZHEJIANG UNIVERSITY, Zhejiang (CN); HUZHOU INSTITUTE OF ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 19/185,129

(22) Filed: Apr. 21, 2025

(65) Prior Publication Data

US 2025/0244220 A1    Jul. 31, 2025

Related U.S. Application Data

(63) Continuation of application No. PCT/CN2023/118340, filed on Sep. 12, 2023.

(30) Foreign Application Priority Data

Nov. 14, 2022  (CN) .......................... 202211431352.3

(51) Int. Cl.
  *G01N 11/00* (2006.01)
  *G01N 33/49* (2006.01)

(52) U.S. Cl.
  CPC ............. *G01N 11/00* (2013.01); *G01N 33/49* (2013.01)

(58) Field of Classification Search
  CPC ...... G01N 11/00; G01N 29/032; G01N 29/22; G01N 33/49
  See application file for complete search history.

(56) References Cited

U.S. PATENT DOCUMENTS

2013/0205875 A1\* 8/2013 Lal .......................... G01N 11/16
                                                                 73/54.41
2015/0018638 A1   1/2015 Shames et al.
(Continued)

FOREIGN PATENT DOCUMENTS

CN       102854090        1/2013
CN       103353479 A  \* 10/2013
(Continued)

OTHER PUBLICATIONS

"International Search Report (Form PCT/ISA/210) of PCT/CN2023/118340," mailed on Nov. 23, 2023, with English translation thereof, pp. 1-4.

*Primary Examiner* — Fatemeh Esfandiari Nia
(74) *Attorney, Agent, or Firm* — JCIPRNET (57) ABSTRACT

The invention discloses a micro-metal tube thrombus elasticity detection device and method based on an L(0,1) longitudinal mode guided wave. The device includes a device housing, a temperature control module, a micrometal tube, and a magnetostrictive assembly. The housing is externally connected to the temperature control module to realize internal constant temperature, the replaceable micro-metal tube is installed inside, the magnetostrictive assembly composed of a permanent magnet and a coil is provided at one end outside the tube. An L(0,1) longitudinal mode guided wave is excited on the micro-metal tube. When liquid viscosity within the tube changes, the energy attenuation of (Continued)

the guided wave propagating along the tube is different. The energy attenuation of the guided wave is defined through the attenuation rate of multiple echo peak values to reflect changes in the blood viscosity.

3 Claims, 4 Drawing Sheets

(56) References Cited

U.S. PATENT DOCUMENTS

2021/0404990 A1* 12/2021 Raja ................. G01K 11/24
2023/0404410 A1* 12/2023 Tang ................. G01N 11/00

FOREIGN PATENT DOCUMENTS

| CN | 112834069 A | * | 5/2021 | ............. G01K 11/24 |
| CN | 113203661 | | 8/2021 | |
| CN | 114624148 | | 6/2022 | |
| CN | 115711938 | | 2/2023 | |

* cited by examiner

MICRO-METAL TUBE THROMBUS ELASTICITY DETECTION DEVICE AND METHOD BASED ON L(0,1) LONGITUDINAL MODE GUIDED WAVE

CROSS-REFERENCE TO RELATED APPLICATION

This application is a continuation of international application of PCT application serial no. PCT/CN2023/118340, filed on Sep. 12, 2023, which claims the priority benefit of China application no. 202211431352.3, filed on Nov. 14, 2022. The entirety of each of the above-mentioned patent applications is hereby incorporated by reference herein and made a part of this specification.

TECHNICAL FIELD

The invention relates to a parameter detection device and method in the field of thrombus elasticity measurement, and specifically relates to a device and a method for detecting thrombus elasticity using a longitudinal mode ultrasonic guided wave.

DESCRIPTION OF RELATED ART

Human coagulation function includes two parts, coagulation and fibrinolysis, and is closely related to coagulation factors, fibrinogen, platelets, etc. in the blood. If the coagulation function is abnormal, thrombotic or hemorrhagic diseases will occur, endangering health or even life. Therefore, it is very important to realize real-time detection of the coagulation function of a patient during surgery. This indicator not only reflects the current physiological condition of the patient, but may also be used to guide the doctor to formulate an appropriate treatment plan. The main thrombus elasticity measurement devices on the market are Sonoclot, TEG, and ROTEM. The published document "Application and Development of Viscoelastic Point-of-Care Coagulation Devices" points out that the devices only differ slightly in technical implementation solutions. However, due to the limitations of probe size and sensitivity, three devices require a large amount of blood for detection and a long detection time. Usually, 1 ml of blood and more than 1 hour of detection time are required, which cannot meet the requirement of real-time detection of the coagulation function in some surgical environments.

Therefore, developing a thrombus elasticity measurement technique that requires a small sample size and involves a rapid and convenient detection has very important research and practical values.

The invention with patent number CN202110378292.2 proposes a blood viscosity rapid detection device and method based on a micro-metal tube ultrasonic guided wave. The correlation between a T(0, 1) torsional mode guided wave signal and liquid viscosity is analyzed through deep learning, which realizes the rapid measurement of blood viscosity to a certain extent. However, the excitation manner is complicated, requiring spraying magnetostrictive powder on a micro-metal tube or installing a strip, which involves high production costs; the magnetic field distribution of excitation is uneven, and an excited T(0, 1) guided wave is not pure, which causes measurement errors, and blood viscosity values measured without temperature is less accurate; the device has high requirements on the sensor technology used for excitation and reception, which is not conducive to practical application and popularization. At the same time, the patent can only obtain static blood viscosity values, does not realize dynamic thrombus elasticity measurement, and cannot analyze the correlation between changes in blood viscosity and time.

SUMMARY

In order to solve the current issues of large amount of blood required for thrombus elasticity measurement and low real-time performance, the invention utilizes the correlation between the propagation attenuation of a longitudinal ultrasonic guided wave in a micro-metal tube and liquid viscosity to propose a thrombus elasticity measurement device and method that is simple to operate, has enhanced real-time performance, and requires less amount of blood.

The invention generates an L(0, 1) longitudinal mode ultrasonic guided wave, establishes the correlation between energy attenuation during the process of guided wave propagation and liquid viscosity in the micro-metal tube, and obtains the attenuation rate of a guided wave signal through processing, thereby realizing real-time accurate measurement of thrombus elasticity.

The invention is realized through the following technical solutions:

1. A micro-metal tube thrombus elasticity detection device based on an L(0, 1) longitudinal mode guided wave:
   including a device housing, a micro-metal tube, and a magnetostrictive assembly;
   the micro-metal tube being installed inside the device housing and containing a blood sample;
   the magnetostrictive assembly being disposed at one end of the micro-metal tube and including a permanent magnet and a hollow coil,
   the permanent magnet being arranged at an end portion of the micro-metal tube;
   the hollow coil being arranged near the end portion of the micro-metal tube.

An excitation reception module is further included. The hollow coil is electrically connected to the excitation reception module.

A data processing module and a display module are further included. The excitation reception module is connected to the data processing module, the data processing module is connected to the display module.

A temperature control module installed in the device housing is further included. The temperature control module includes a temperature detection module and a heating module electrically connected to each other. The temperature detection module is connected to the device housing or the micro-metal tube, and the heating module is also connected to the device housing or the micro-metal tube.

The magnetostrictive assembly is installed at one end of the micro-metal tube, the permanent magnet is directly connected to an end surface of the micro-metal tube through magnetism, the hollow coil is sleeved outside the micro-metal tube, a coil inner wall does not contact a metal tube outer wall, a coil inner diameter differs from a metal tube outer diameter by less than 1.0 mm. The micro-metal tube is directly disassembled and replaced through plugging and unplugging.

The micro-metal tube is made of a magnetic material, and the permanent magnet is magnetically attracted to the end portion of the micro-metal tube.

A material of the micro-metal tube is a magnetic conductive material such as nickel, iron, iron-nickel alloy, iron-aluminum alloy, and iron-cobalt alloy.

2. A micro-metal tube thrombus elasticity detection method based on an L(0, 1) longitudinal mode guided wave. Steps of the method are as follows:
1) a guided wave dispersion curve of a micro-metal tube is calculated according to structural geometric parameters and material mechanical characteristics of the micro-metal tube, and a frequency point with a small dispersion degree is selected as an excitation frequency according to the guided wave dispersion curve; the small dispersion degree is defined as a frequency range of $\Delta v/\Delta f<0.25$ m/(s*kHz), where $\Delta v$ is a phase velocity change amount, $\Delta f$ is a frequency change amount, the range is f<250 kHz for an L(0, 1) mode guided wave.
2) when the micro-metal tube is a hollow tube, a hollow coil on the micro-metal tube is excited to generate the L(0, 1) mode guided wave reciprocally propagating between two end surfaces of the micro-metal tube until energy is exhausted, a tube length is d meters, first k reciprocating processes are collected through the hollow coil, a total echo signal of k*2d meters is used as a hollow tube reference signal $w_0$;
3) an in vitro blood sample is filled into the micro-metal tube, an echo signal is obtained according to step 2) to be used as a filling detection signal, an i-th filling detection signal is $w_i$;
4) envelopes of the hollow tube reference signal $w_0$ and the filling detection signal $w_i$ each time are taken to obtain respective envelope signals, n echo peak values are taken from the envelope signal for fitting to obtain respective attenuation rates $b_0$ and $b_i$, a relative blood viscosity corresponding to the filling detection signal $w_i$ each time is obtained according to the attenuation rates $b_0$ and $b_i$ combined with a relationship between a relative blood viscosity and an attenuation rate of the blood sample obtained in advance for calibration, that is, a relative blood viscosity during an i-th detection is reflected through $b_i/b_0$:

In the invention, a positive correlation is established between the relative blood viscosity and the attenuation rate of the blood sample.
5) a sampling number m and a sampling interval $\Delta t$ are set for detection, steps 3) and 4) are continuously repeated after the blood sample is filled into the micro-metal tube to sample and obtain a relative blood viscosity of each detection, thereby drawing a curve of the relative blood viscosity of the blood sample within a time m*$\Delta t$ as a thrombelastography to realize thrombus elasticity measurement.

The innovation of the invention lies in that the micro-metal tube is disposed for measuring the blood sample to obtain a thrombus elasticity detection result. The echo signal obtained by measurement is subjected to specific echo peak value processing to obtain the accurate attenuation rate, the relationship between the attenuation rate and the relative blood viscosity of the blood sample is discovered and established, the relationship is used to obtain the accurate thrombus elasticity detection result.

In the step 4), a specific method for taking the n echo peak values from the envelope signal is: selecting an appropriate first threshold $l_1$ and second threshold $l_2$ according to the envelope signal, with an interval $l=l_1-l_2$ between the two, starting to establish n consecutive intervals with length l, that is, intervals $[x_0, x_0+l]$, $[x_0+l, x_0+2l]$ ... $[x_0+(n-1)l, x_0+nl]$, from a starting point $x_0$, that is, a position of the first threshold $l_1$, selected on the envelope signal, so that each of the intervals contains only one peak value, extracting the peak value within each of the intervals as the echo peak value, extracting all the peak values within n intervals as the final selected n echo peak values, numbered 1-n.

In the step 4), a specific fitting method of the attenuation rate of the echo peak value is that the attenuation rate is obtained by fitting according to a following formula:

$$y = a*b^x$$

where x represents a sequence number of the echo peak value, y is a value of the echo peak value, b is the attenuation rate of the echo peak value, a represents an amplitude normalization coefficient.

The method of the invention has a fast data transmission speed. Through the method of the invention, in the step 5), the relative blood viscosity collected at every $\Delta t$ time interval is updated in real time on the display module without waiting until all sampling is completed before displaying the detection result.

The method of the invention obtains the attenuation rate of the echo peak value by processing through adopting a specific manner, which can better and more accurately reflect results of thrombus elasticity parameters compared with parameters such as amplitude attenuation and flight time in the prior art; also, the method of the invention only establishes a nonlinear relationship between the attenuation rate of the echo peak value and the relative blood viscosity, which can more accurately detect and obtain the thrombus elasticity result.

The detection device of the invention includes the device housing, the temperature control module, the micro-metal tube, the magnetostrictive assembly, the excitation reception module, the data processing module, and the display module.

The housing is externally connected to the temperature control module to realize an internal constant temperature, the replaceable micro-metal tube is installed inside; the magnetostrictive assembly composed of the permanent magnet and the coil is provided at one end outside the tube;
The magnetostrictive assembly is connected to the excitation reception module, the excitation reception module is connected to the data processing module and the display module.

In the invention, since the L(0, 1) longitudinal mode guided wave is excited on the micro-metal tube, when liquid viscosity within the tube changes, the energy attenuation of the guided wave propagating along the tube is different. The energy attenuation of the guided wave is defined through the attenuation rate of multiple echo peak values to reflect changes in the blood viscosity.

The invention overcomes defects of poor real-time performance, large collection amount, and poor portability of a traditional thrombus elasticity measurement device and can realize the real-time and accurate measurement of thrombus elasticity, with a small amount of blood sampled and simple operation of the detection method.

The beneficial effects of the invention are:
The invention can detect blood viscosity by utilizing the correlation between the attenuation rate of the echo peak value of the L(0, 1) longitudinal mode guided wave and changes in the blood viscosity, with simple data acquisition and processing. The micro-metal tube is used as a carrier during the detection process. A small amount of blood is required and the overall measurement time is short. The issues of poor real-time performance and large collection amount of the traditional thrombus elasticity device are effectively overcome.

The detection device proposed in the invention has high integration, small size, and portability, and can update changes in the blood viscosity during the measurement process in real time on the display module of a host computer, which can be used on-site and help medical staff understand the condition of a patient in a timely and convenient manner.

DESCRIPTION OF THE EMBODIMENTS

The invention will be further described below in conjunction with the drawings and specific implementation.

Figure 1:
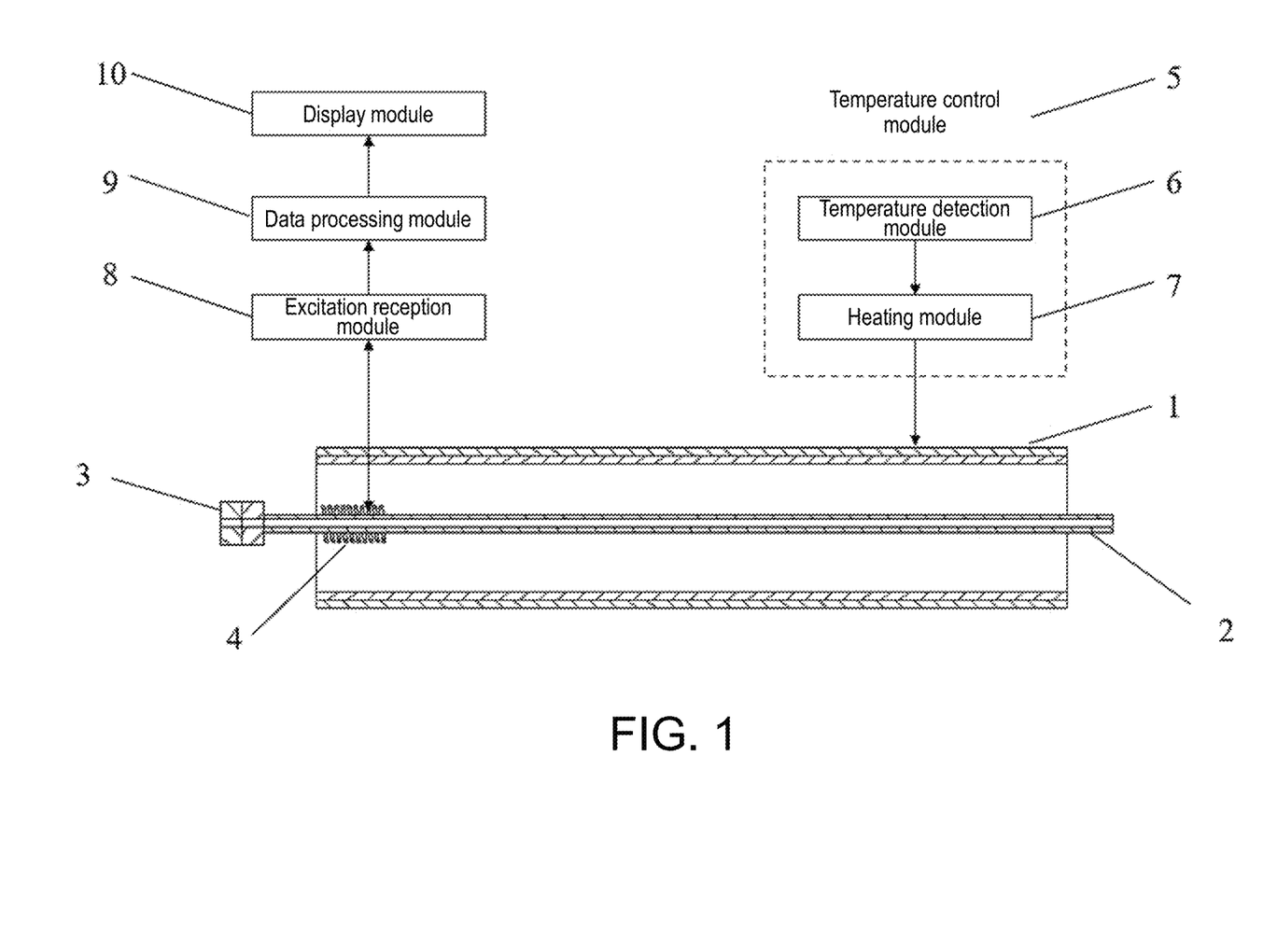
FIG. 1 is a composition structural diagram of a thrombus elasticity measurement device.

As shown in FIG. 1, a device housing 1, a micro-metal tube 2, and a magnetostrictive assembly are included;

The micro-metal tube 2 is installed inside the device housing 1 and is used as a liquid to be measured container and a guided wave propagation carrier, the device housing 1 and the micro-metal tube 2 are in contact and connected, and contain an in vitro blood sample.

The magnetostrictive assembly is disposed at one end of the micro-metal tube 2 and includes a permanent magnet 3 and a hollow coil 4. The permanent magnet 3 is used to provide a longitudinal constant magnetic field, the hollow coil 4 is used to provide a dynamic longitudinal magnetic field and receive an echo signal when powered.

The permanent magnet 3 is arranged at an end portion of the micro-metal tube 2 and is used to provide a longitudinal constant magnetic field;

The hollow coil 4 is arranged near the end portion of the micro-metal tube 2, may be hollowly sleeved outside the micro-metal tube 2, and is used to provide a dynamic longitudinal magnetic field and receive an echo signal when powered.

An excitation reception module 8 is further included. The hollow coil 3 is electrically connected to the excitation reception module 8.

A data processing module 9 and a display module 10 are further included. The excitation reception module 8 is connected to the data processing module 9, the data processing module 9 is connected to the display module 10.

The excitation reception module 8 excites and generates multiple periodic pulse signals, which are applied onto the excitation reception module 8 of the magnetostrictive assembly. The hollow coil 4 is powered via the excitation reception module 8 to generate the dynamic longitudinal magnetic field, and the permanent magnet 3 fixedly generates the longitudinal constant magnetic field.

Under the combined effect of the longitudinal constant magnetic field generated by the permanent magnet 3 and the dynamic longitudinal magnetic field generated by the hollow coil 4 when powered, the micro-metal tube 2 is deformed based on the magnetostrictive effect, thereby generating an L(0, 1) mode guided wave affected by the blood sample in the micro-metal tube 2 and propagating on the micro-metal tube 2;

The hollow coil 4 receives the echo signal after propagation based on the inverse magnetostrictive effect, which is collected via the excitation reception module 8, transmitted to the data processing module 9 for data processing such as filtering, amplification, and sampling, and finally uploaded to the display module 10 for display.

A temperature control module 5 installed on the device housing 1 is further included. The temperature control module 5 includes a temperature detection module 6 and a heating module 7 electrically connected to each other. The temperature detection module 6 is connected to the device housing 1 or the micro-metal tube 2, the heating module 7 is also connected to the device housing 1 or the micro-metal tube 2 to realize an internal constant temperature of 37° C. to simulate the internal environment of blood in the human body.

The temperature detection module 6 detects the temperature of the micro-metal tube 2 in real time through a temperature sensor inside itself, and drives the heating module 7 to work and heat when the temperature changes to realize the constant temperature of blood in the human body.

The magnetostrictive assembly is installed at one end of the micro-metal tube 2, the permanent magnet 3 is directly connected to an end surface of the micro-metal tube 2 through magnetism, the hollow coil 4 is sleeved outside of the micro-metal tube 2, a coil inner wall does not contact a metal tube outer wall, a coil inner diameter differs from a metal tube outer diameter by less than 1.0 mm. The micro-metal tube 2 is directly disassembled and replaced through plugging and unplugging.

The micro-metal tube 2 is made of a magnetic material, the permanent magnet 3 is magnetically attracted to the end portion of the micro-metal tube 2.

In a specific implementation, a material of the micro-metal tube 2 is a magnetic conductive material such as nickel, iron, iron-nickel alloy, iron-aluminum alloy, and iron-cobalt alloy. The inner diameter of the micro-metal tube 2 is fine with a length not exceeding 200 mm, the inner diameter does not exceed 1.5 mm.

Examples of the complete method implemented according to the above invention content of the invention are as follows:

In a specific example, the micro-metal tube 2 was a fine carbon steel tube with a length of 200 mm, an outer diameter of 3 mm, an inner diameter of 1 mm; the coil 4 has a length of 15 mm, an inner diameter of 4 mm, 1500 turns, a wire diameter of 0.1 mm; the permanent magnet 3 was a circular magnet magnetized in the thickness direction with a diameter of 10 mm and a height of 5 mm.

In addition, the heating module 7 was a heating sheet with a power of 0.02 W attached to an inner wall of the device housing 1; the excitation reception module 8 excited the L(0, 1) longitudinal mode guided wave.

1) According to inner and outer diameters of the selected micro-metal tube 2, the density, the elastic modulus, and the Poisson's ratio of iron, an L(0, 1) dispersion curve was calculated to find the optimal excitation frequency around 87 kHz.

Figure 2:
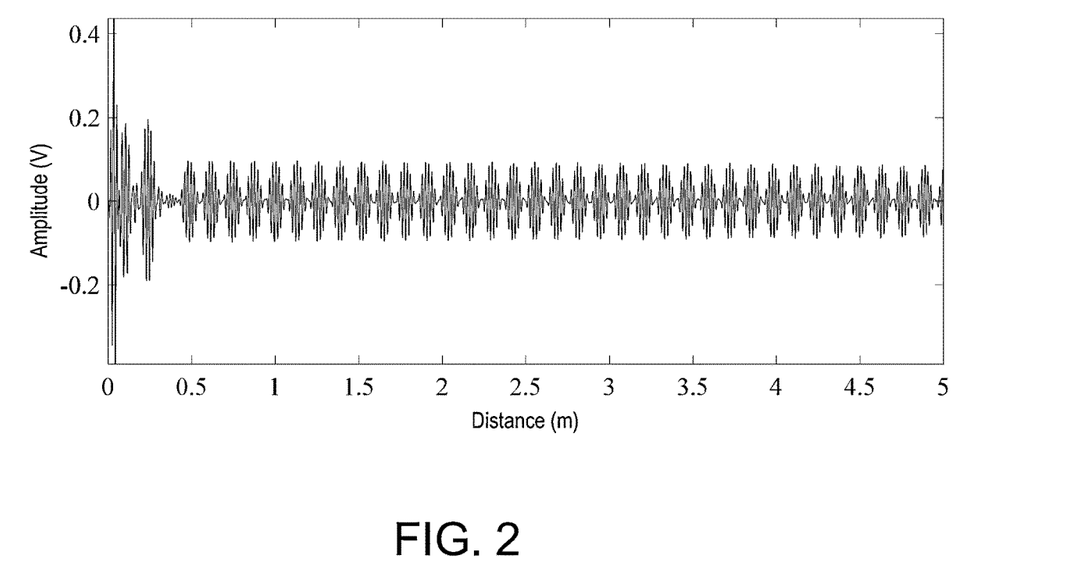
FIG. 2 is a hollow tube detection signal.

2) In a hollow tube state, the echo signal of reciprocating reflection with a collection distance of 5 meters is shown in FIG. 2.

3) The blood sample to be measured was pushed into one end of the horizontally placed micro-metal tube 2 through a medical injection needle until blood flowed out from the other end, and the tube was considered to be full. Then, one end of the micro-metal tube 2 was attracted to a circular magnet to be blocked, the other end was sealed through a silicone plug.

For the selected micro-metal tube 2 with a length of 200 mm, an outer diameter of 3 mm, and an inner diameter of 1 mm, only about 157 μl of blood is theoretically required when full, which is far less than the amount of blood required for traditional thrombus elasticity detection.

Figure 3:
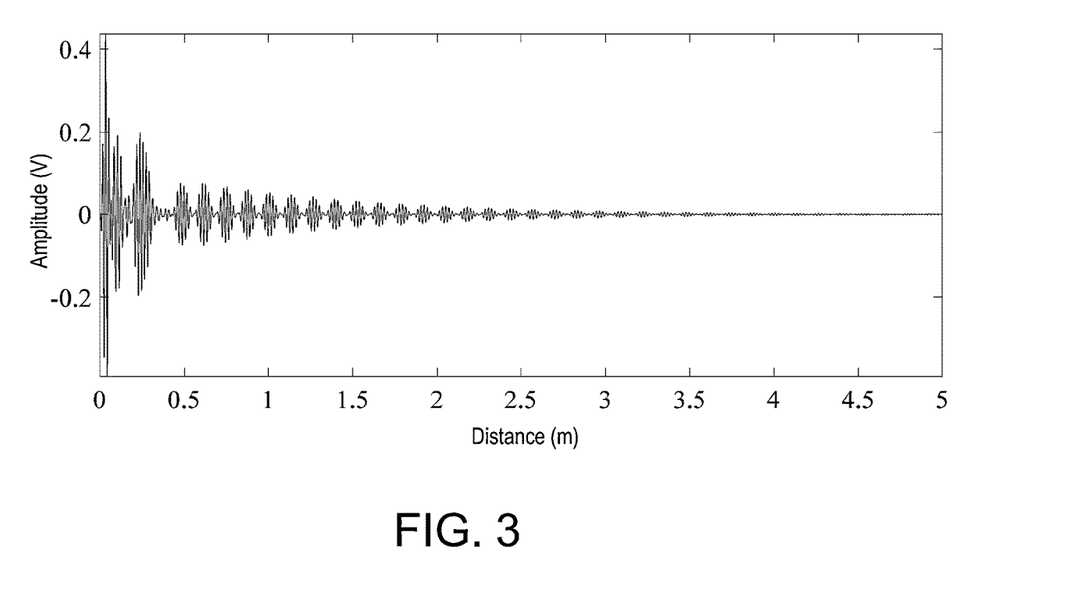
FIG. 3 is a diagram of a filling detection signal.
Figure 4:
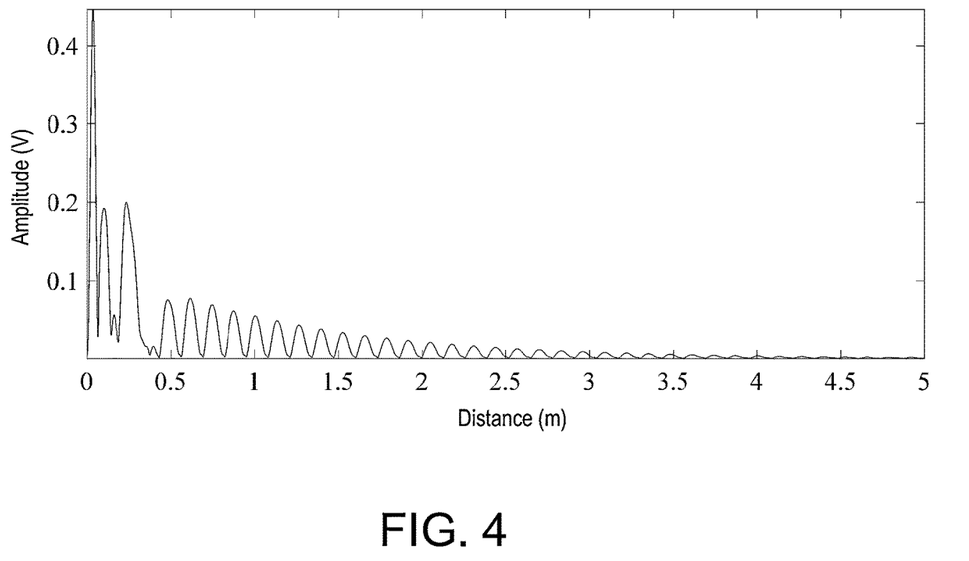
FIG. 4 is an envelope of a filling detection signal.

4) After filling was completed, the echo signal was collected again. A filling detection signal obtained through data processing is as shown in FIG. 3, an envelope of the signal is as shown in FIG. 4.

Figure 5:
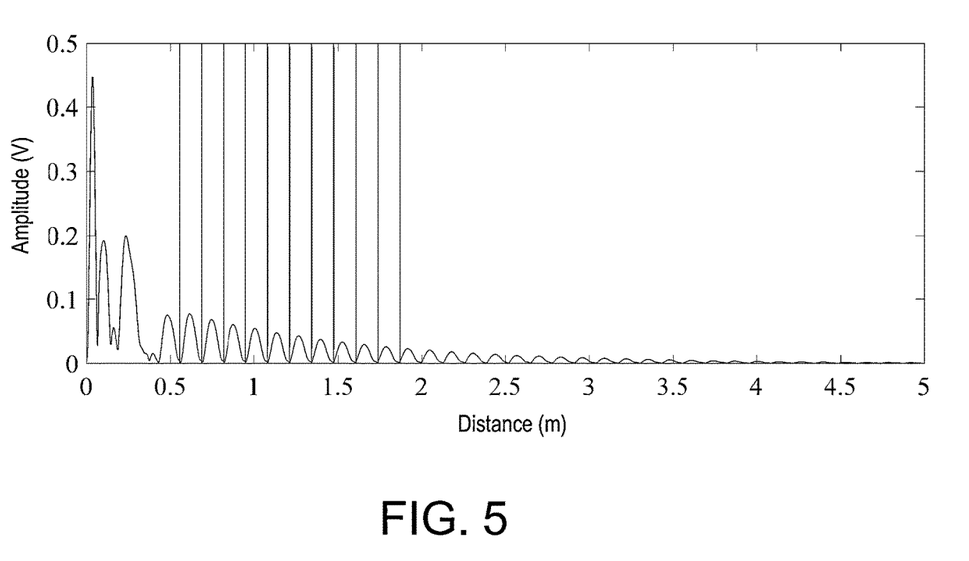
FIG. 5 is a schematic diagram of setting a threshold.

5) The threshold was set according to the signal and the echo peak values within 10 intervals were taken, as shown in FIG. 5, to calculate the attenuation rate, and calculate the relative blood viscosity. Sampling was continuously performed 500 times with a sampling interval of 5 s.

Figure 6:
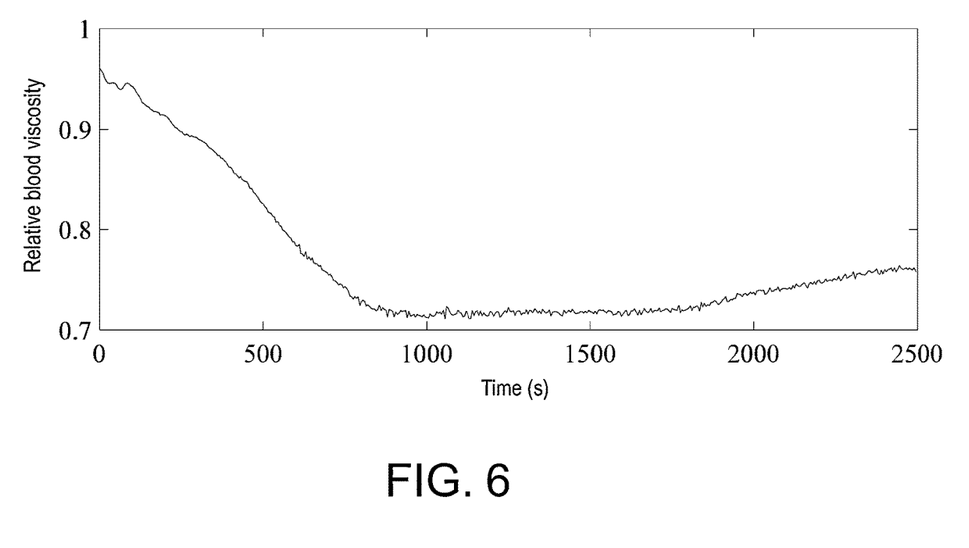
FIG. 6 is a diagram showing a thrombus elasticity measurement effect.

The measurement result is as shown in FIG. 6. The relative blood viscosity increases first and then decreases over time, which is consistent with the whole process of blood coagulation and fibrinolysis in vitro. Therefore, the measurement result may be used as a result image of thrombus elasticity measurement. Parameters such as viscosity drop, total rise time, slope, and viscosity inflection point time may be further calculated according to the image, which may help medical staff understand the specific situation of the coagulation function of a patient. According to the result of FIG. 6, the relative blood viscosity reaches the lowest point after about 900 seconds, that is, the entire coagulation process is measured for about 15 minutes, which is significantly shorter than a traditional thrombus elasticity measurement device and has better real-time performance.

Comparative Example 1

Compared with the existing method, the method proposed in the invention has higher measurement precision. Verification experiments were performed using six viscosity liquids with viscosities of 4.8 cp, 21.2 cp, 48.2 cp, 98.5 cp, 198 cp, and 476 cp. The attenuation rates of the viscosity liquids with 4.8 cp, 48.2 cp, 98.5 cp, and 476 cp were calculated according to the method of the invention to be 0.9946, 0.9331, 0.8967, and 0.8122. A correlation function of viscosity and attenuation rate obtained through power fitting is as follows:

$$y = -0.0534 * x^{0.2591}$$

where y represents the attenuation rate, x represents a liquid viscosity value. The remaining two viscosity liquids with 21.2 cp and 198 cp were taken. The attenuation rates were calculated according to the method of the invention to be 0.9559 and 0.8667. The liquid viscosities were inferred according to the fitting formula to be 22.0973 cp and 191.3934 cp, the measurement errors were 4.23% and 3.34%, which are less than 5%.

However, according to a blood viscosity rapid detection device and method based on a micro-metal tube ultrasonic guided wave proposed by the existing invention with patent number CN202110378292.2, viscosities of two liquids to be measured were predicted, results obtained were 23.9043 cp and 209.0347 cp, measurement errors were 12.76% and 5.57%, both of which are greater than the errors obtained by the method of the invention.

The above specific implementation manners are used to explain the invention rather than to limit the invention. Any modification and change made to the invention within the spirit of the invention and the protection scope of the claims shall fall within the protection scope of the invention.

What is claimed is:

1. A micro-metal tube thrombus elasticity detection method based on an L(0, 1) longitudinal mode guided wave applied to a micro-metal tube thrombus elasticity detection device, the micro-metal tube thrombus elasticity detection device comprising a device housing, a micro-metal tube, and a magnetostrictive assembly; the micro-metal tube being installed inside the device housing and containing a blood sample; the magnetostrictive assembly being disposed at one end of the micro-metal tube and comprising a permanent magnet and a hollow coil, the permanent magnet being arranged at an end portion of the micro-metal tube; the hollow coil being arranged near the end portion of the micro-metal tube, wherein steps of the method are as follows:

1) calculating a guided wave dispersion curve of the micro-metal tube according to structural geometric parameters and material mechanical characteristics of the micro-metal tube, selecting a frequency point with a small dispersion degree as an excitation frequency according to the guided wave dispersion curve;

2) when the micro-metal tube is a hollow tube, exciting a hollow coil on the micro-metal tube to generate an L(0, 1) mode guided wave reciprocally propagating between two end surfaces of the micro-metal tube until energy is exhausted, wherein a tube length is d meters, collecting first k reciprocating processes through the hollow coil, using a total echo signal of k*2d meters as a hollow tube reference signal ($w_0$);

3) filling a blood sample into the micro-metal tube, obtaining an echo signal according to step 2) to be used as a filling detection signal, wherein an i-th filling detection signal is ($w_i$);

4) taking envelopes of the hollow tube reference signal ($w_0$) and the filling detection signal ($w_i$) each time to obtain respective envelope signals, taking n echo peak values from the envelope signal for fitting to obtain respective attenuation rates ($b_0$) and ($b_i$), obtaining a relative blood viscosity corresponding to the filling detection signal ($w_i$) each time according to the attenuation rates ($b_0$) and ($b_i$) combined with a relationship between a relative blood viscosity and an attenuation rate of the blood sample obtained in advance for calibration;

5) setting a sampling number (m) and a sampling interval (Δt) for detection, continuously repeating steps 3) and 4) after the blood sample is filled into the micro-metal tube to sample and obtain a relative blood viscosity of each detection, thereby drawing a curve of the relative blood viscosity of the blood sample varied with time within a time (m*Δt) as a thrombelastography to realize thrombus elasticity measurement.

2. The micro-metal tube thrombus elasticity detection method based on the L(0, 1) longitudinal mode guided wave according to claim 1, wherein:

in the step 4), a specific method for taking the n echo peak values from the envelope signal is: selecting a first threshold ($l_1$) and a second threshold ($l_2$) according to the envelope signal, with an interval (l) between the two, starting to establish n consecutive intervals ($[x_0, x_0+l], [x_0+l], [x_0+2l] \ldots [x_0+(n-1)l, x_0+nl]$) with length which is the interval (l), from a starting point ($x_0$), that is, a position of the first threshold ($l_1$), selected on the envelope signal, so that each of the intervals contains only one peak value, extracting the peak value within each of the intervals as the echo peak value, extracting all the peak values within n intervals as the final selected n echo peak values.

3. The micro-metal tube thrombus elasticity detection method based on the L(0, 1) longitudinal mode guided wave according to claim 1, wherein:

in the step 4), the attenuation rate is obtained by fitting according to a following formula:

$$y = a * b^x$$

where x represents a sequence number of the echo peak value, y is a value of the echo peak value, b is the attenuation rate of the echo peak value, a represents an amplitude normalization coefficient.

\* \* \* \* \*